A. HILDER.
FOCUSING ATTACHMENT FOR ROLL FILM CAMERAS.
APPLICATION FILED MAR. 30, 1921.
1,431,657.
Patented Oct. 10, 1922.
3 SHEETS—SHEET 3.
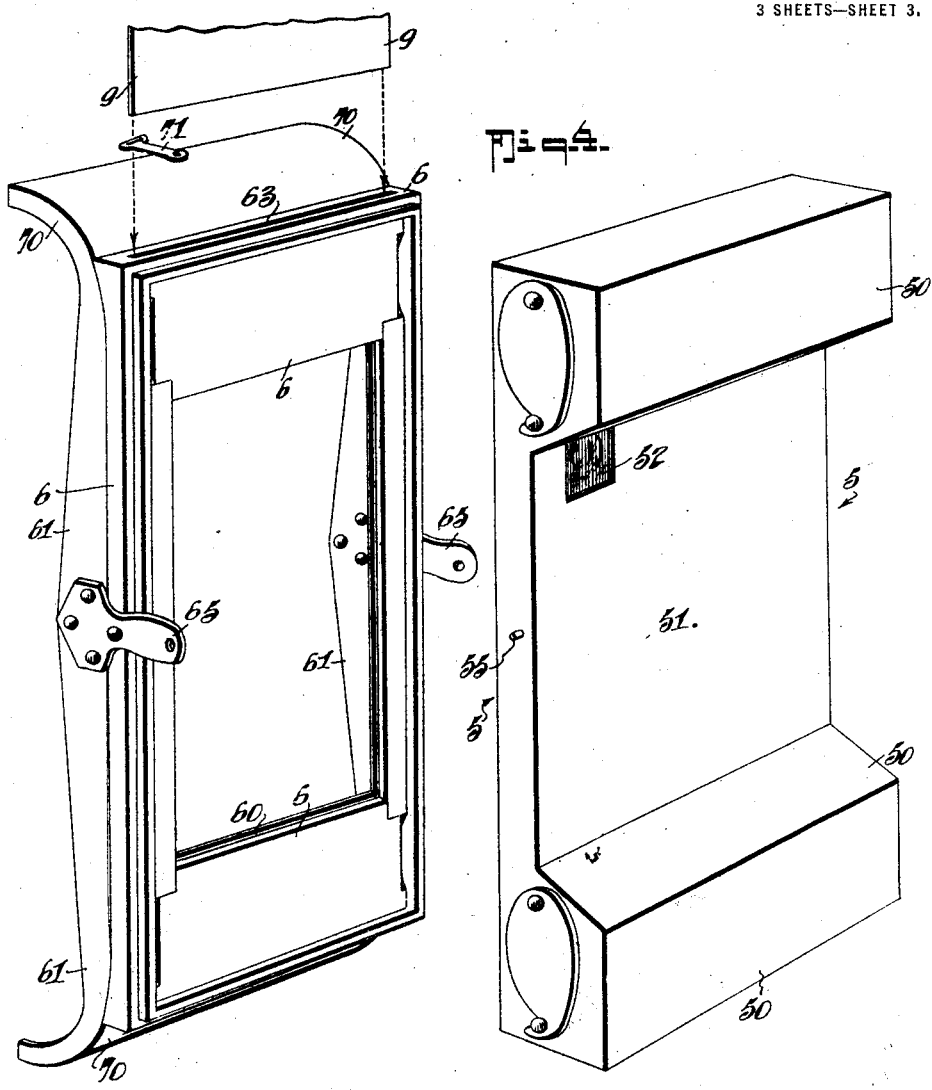
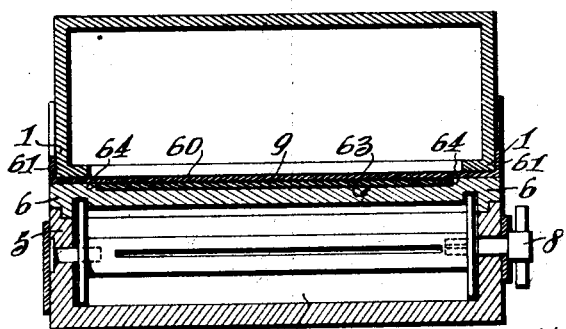
INVENTOR
A. Hilder.
BY
H. Winship Wheatley
ATTORNEY Patented Oct. 10, 1922.

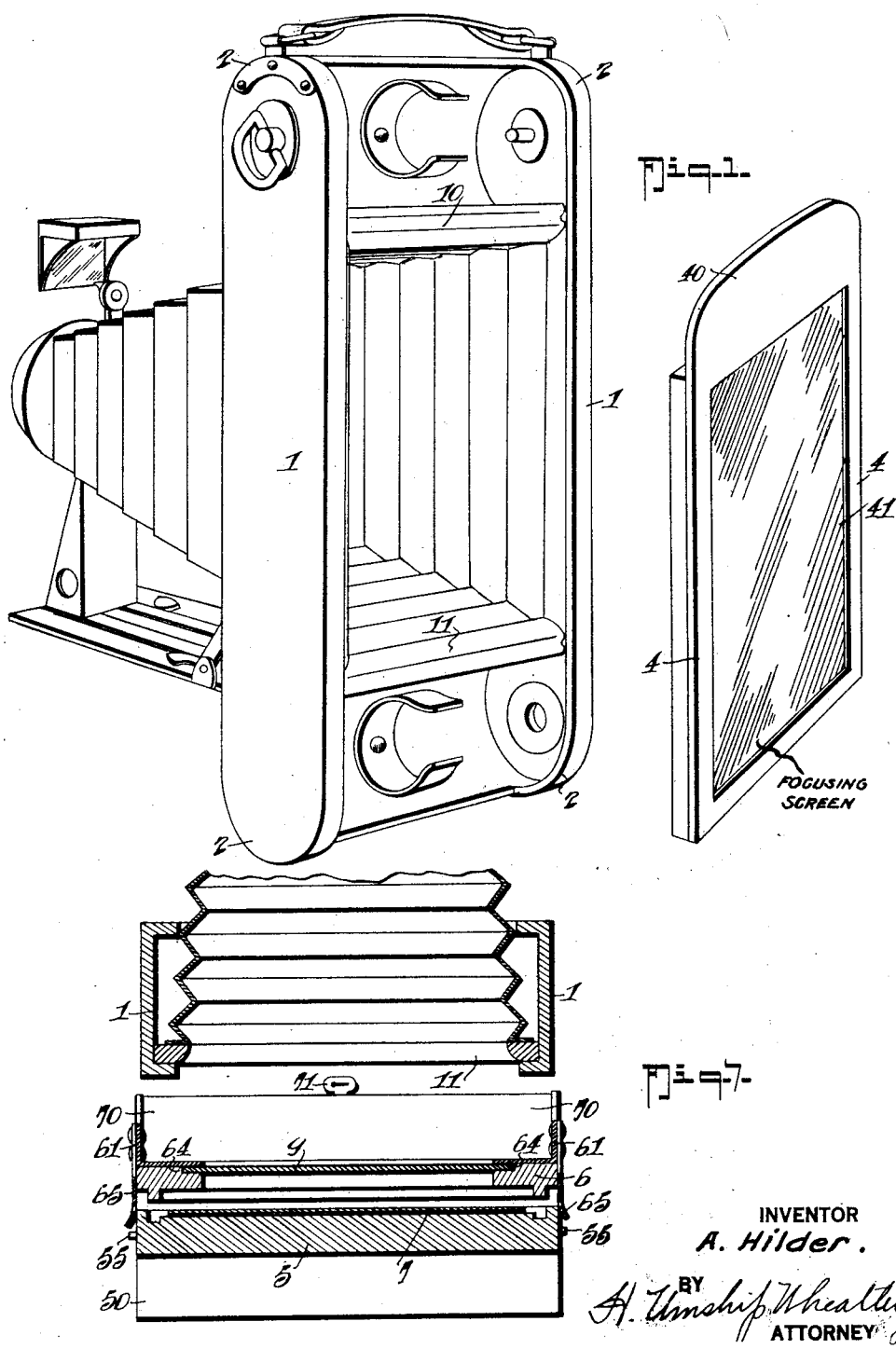

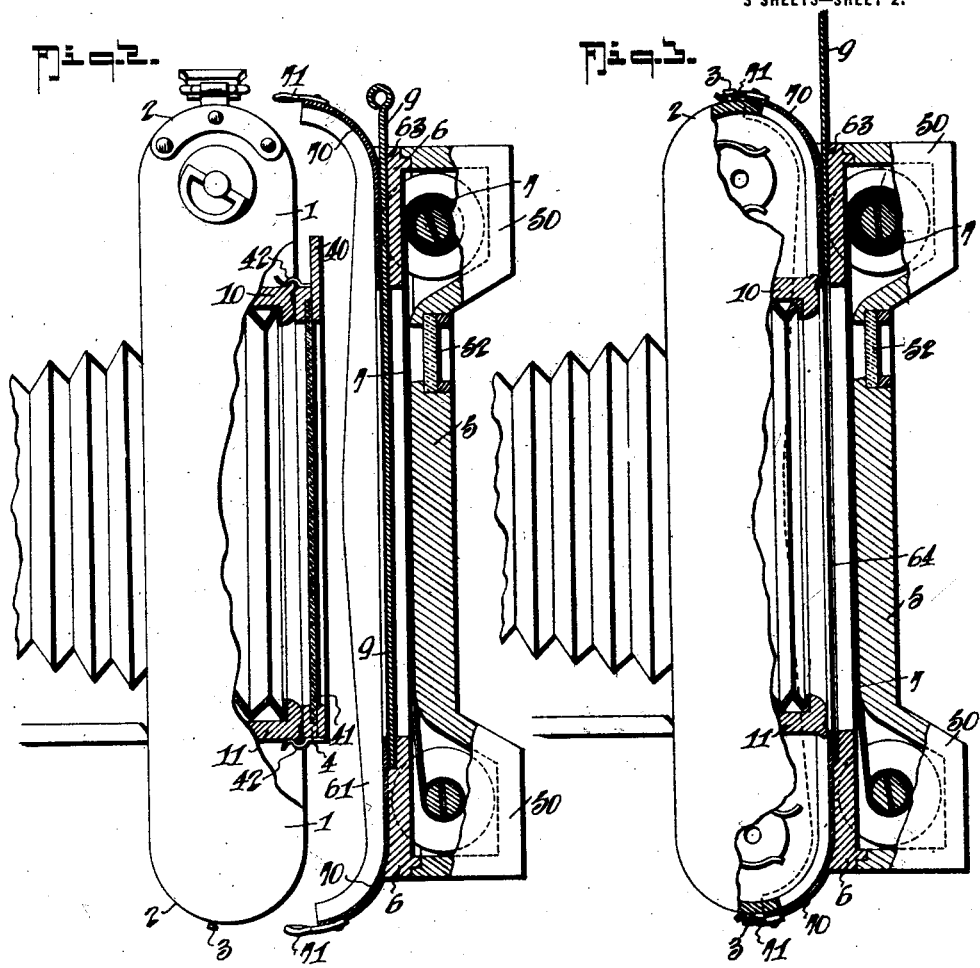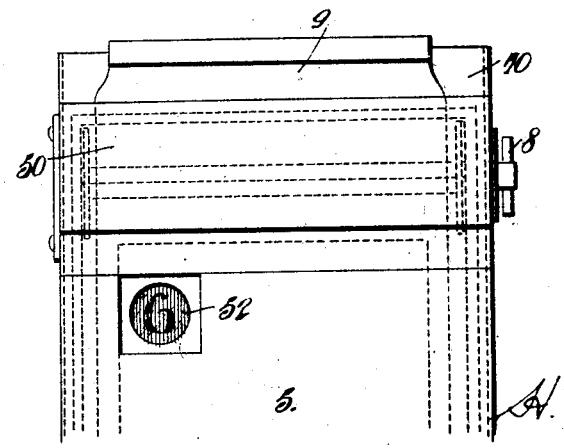

1,431,657

UNITED STATES PATENT OFFICE.

ALFRED HILDER, OF PITTSBURG, KANSAS.

FOCUSING ATTACHMENT FOR ROLL-FILM CAMERAS.

Application filed March 30, 1921. Serial No. 456,952.

*To all whom it may concern:*

Be it known that I, ALFRED HILDER, a citizen of the United States, residing at Pittsburg, in the county of Crawford and State of Kansas, have invented a new and useful Focusing Attachment for Roll-Film Cameras, of which the following is a specification.

This invention has reference to an improved attachment for roll film cameras which is especially designed to enable the operator to focus the camera and bring out the features to be snapped as well on a cartridge film as is possible in the use of a plate camera.

Another and essential object of my invention is to provide an attachment for the general purpose stated, of a simple and inexpensive construction, in which provision is made for loading and unloading a camera in daylight.

Another object of my invention is to provide a range finding and daylight loading attachment for cameras in which the parts are so designed and cooperatively arranged, whereby to adapt the same for being readily attached to any roll film camera without requiring any change or reconstruction of the camera to permit of its use and which may be easily and conveniently operated and which effectively serves its intended purpose.

My invention comprises, in an attachment of the general character mentioned, the peculiar features of construction and novel arrangement of the parts fully explained in the following detailed description, specifically set out in the appended claims and illustrated in the accompanying drawings, which illustrate a preferred arrangement of the parts that constitute my complete attachment and in which—

Figure 1 is a perspective view of a conventional type of roll film cameras, the usual cartridge film and back cover being removed, the focusing member, that constitutes a part of my complete attachment, shown in position for being applied to the camera.

Figure 2 is a side elevation, parts being in section of the focusing end of the camera with the focusing devices operatively applied, the film holder, the dark slide and the slide container devices being shown in vertical section and in position for being attached to the camera, after the focusing or range devices are removed.

Figure 3 is a view similar to Figure 2 and illustrates the film holder, the dark slide container applied and the parts in position for taking a previously focused picture.

Figure 4 is a perspective view of the dark slide container and the film devices holder, separated, the method of applying the dark slide being also indicated.

Figure 5 is a detail rear elevation of the parts as in Figure 3 and indicates the red glass exposure located as in the ordinary camera back.

Figure 6 is a horizontal section of the upper rear end of the camera and my attachment, the latter being shown as operatively applied.

Figure 7 is a horizontal section of the back end of the camera and my attachment, the several parts being positioned for being operatively joined.

As hereinbefore stated, my attachment is adapted for being applied to any of the conventional types of roll film cameras without necessitating any change or alteration of the parts thereof.

In the drawings is shown so much of a conventional form of roll film camera as is necessary for illustrating an operative application of my invention and which includes the back member 1 having the usual rounded upper and lower edges 2—2, which, when my attachments are to be used in connection therewith, each have a headed stud 3, the purpose of which will presently appear.

My improved attachment, in the complete make-up, embodies a focusing screen, a dark slide container or frame and a cartridge film holder, each constituting a separate or independent part, the focusing screen being used in connection with the camera for focusing purposes only, while the dark slide container and the film holder portion, are independent parts but are used together, when the attachment is applied for taking the picture, it being understood that during the operation of taking the picture, the focusing element is not used.

The focusing element consists of a rectangular frame 4 whose upper end is extended as at 40 to form a finger hold and into the said frame 4 is fitted, in any well known manner, a ground glass or focusing screen 41, spring snaps 42—42 being secured to the upper and lower frame members for engaging with upper and lower rim portions 10 and 11 on the camera back for holding the focusing screen in place, as is clearly shown in Figure 2.

The cartridge film holder 5 that constitutes the main body portion of the attachment has chambers 50—50 at the top and bottom, identical in construction with the film chambers of the ordinary camera and in which the film cartridge and take-up roller devices are journaled, as is clearly indicated in Figures 2, 3, 4 and 6, the back member 51 of the holder 5 having the usual red glass exposure 52, located in the upper left hand corner of the back in the usual position for exposing the numbers on the film for setting the film for the "next" exposure.

The dark slide devices, which constitute a part of my improved attachment, comprise a vertically elongated rectangular frame 6, preferably of wood, to the front face of which is secured a sheet metal plate 60 whose opposite edges are bent at right angles to form side flanges 61—61, which extend over the opposite sides of the camera back 1, see full lines on Figure 2 and full lines on Figure 6, when the attachment is applied.

Plate 6 is cut out to provide the vertically extended rectangular exposure opening, back of which the film 7 passes, as is clearly shown in Figures 2 and 3, it being understood that the film devices include the usual winding key 8, see Figures 5 and 6.

The rectangular framing includes a slotway 63 and opposite edge guides 64—64 for accommodating the dark slide 9, which is entered through and withdrawn from the frame 6, as is clearly indicated on Figure 4.

For conveniently holding the frames 4 and 6 together, the latter has spring clips 65—65 that slip over and interlock with catch studs 55—55 on the sides of the holder 5, when the two parts are being assembled, see Figure 7.

To provide for a tight closure of the dark slide container onto the camera back 1, the metal plate 7 has its upper and lower ends terminate in curved extensions 70—70 that snugly fit over the upper and lower rounded edges of the camera back and on which they are firmly secured, when the attachment is applied for use by pivoted hooks 71 that are arranged for engaging the headed studs 3—3 before referred to and as shown in Figures 2 and 3.

From the foregoing description taken in connection with the drawings, the complete construction, the manner of its operation and the advantages of my attachment will be readily apparent to those familiar with the use of roll film cameras.

In operation, a camera used with my improved attachment is manipulated as follows:

The usual film devices and back cover are removed and the focusing device 4 is attached to the camera back, as in Figure 2, and the object to be snapped, is focused.

The element 4 is then removed and the complete attachment, other than the device, is then attached to the back of the camera and secured by the hooks 71 and the studs 3 and in position as shown in Figure 3.

The dark slide 9 is then raised, as in Figure 3, and thus leaves the camera ready for exposure, the same as if it had a fully equipped ordinary back.

After exposure is made, the dark slide is lowered as is indicated on Figure 2 and the attachment may be removed from the camera with safety to all films.

For further pictures, the above mentioned process is repeated, turning the film key 8 the same as in the ordinary camera.

My attachment has such form and the construction of the parts thereof is well adapted for practically operating in connection with any camera using a cartridge film and will enable the operator to as sharply focus and bring out details with a roll film camera as with a plate camera.

What I claim is—

1. An attachment for roll film cameras comprising a focusing element adapted to be readily removably attached to the back of the camera, a film holder, a dark slide and a carrier therefor, means for connecting the said carrier and the film holder together, the carrier having an opening for exposing the film through the back of the camera and means for detachably securing the dark slide carrier and the film holder onto the back of the camera, after it has been focused.

2. An attachment for roll film cameras comprising a focusing element adapted for being removably secured over the open rear end of the camera, a film holder having a film receiving chamber at each of its upper and lower ends, means for passing the film from one end to the other, a dark slide, a slide carrier having an opening through which the exposure is made and which is closed by the slide, and means for securing the slide carrier and film holder together, and other means for securing the slide carrier over the opening in the camera back.

3. As an improvement in roll film cameras, the combination with the camera back provided with a free opening through which the picture is exposed; of a film holder having a film chamber at each of the upper and lower ends, means for passing the film from one end compartment to the other and across the opening in the camera back, a dark slide and a slide carrier interposed between the film holder and the camera back and means for holding the slide carier and the film holder in fixed relation onto the camera back for the purposes specified.

4. In an attachment of the character described, the combination with a roll film camera back having an opening through which the picture is exposed, a film holder having a film receiving chamber at each of the upper and lower ends, and means for transferring the film from one chamber to the other chamber and across the opening in the camera back, a dark slide and carrier therefor, the latter having upper and lower curved extensions and side flanges for lapping over the camera back, means for fixedly sustaining the said carrier over the camera back and other means for fixedly attaching the film holder onto the slide carriers.

5. As a new article, an attachment for roll film cameras comprising a focusing element adapted for being removably mounted over the rear open end of a camera, a film holder having a film chamber at each of the upper and lower ends, means for transferring the cartridge film from one chamber to the other chamer and across the exposed end of the camera, a dark slide, a carrier therefor having an opening for aligning with the opening in the camera back, and across which the dark slide is adjustable, the slide carrier and the film holder having interengaging means for securing the two elements together and the slide carrier having means for securing the attachment to the back of the camera.

ALFRED HILDER.